(No Model.)

A. C. REX.
GAME.

No. 296,352. Patented Apr. 8, 1884.

Attest
L. J. Matin
Jno. McWade

Inventor
Alfred C. Rex.
By his atty

UNITED STATES PATENT OFFICE.

ALFRED C. REX, OF PHILADELPHIA, PENNSYLVANIA.

GAME.

SPECIFICATION forming part of Letters Patent No. 296,352, dated April 8, 1884.

Application filed January 26, 1884. (No model.)

*To all whom it may concern:*

Be it known that I, ALFRED C. REX, of the city of Philadelphia, county of Philadelphia, and State of Pennsylvania, have invented an Improvement in Games, of which the following is a specification.

My invention has reference to games; and it consists in a plate having a series of depressions therein, and provided with a tube extending upward from one place in its periphery, the top of said tube being open to receive the marble or its equivalent, and the side of said tube next to the plate being provided with an aperture to allow the marble to roll down into the plate, and in details of construction, all of which are fully set forth in the following specification, and shown in the accompanying drawings, which form part thereof.

The object of my invention is to produce a simple inexpensive toy or game, having practically as much utility as many of the complicated games of the same class manufactured and put upon the market at the present time.

Figure 1:
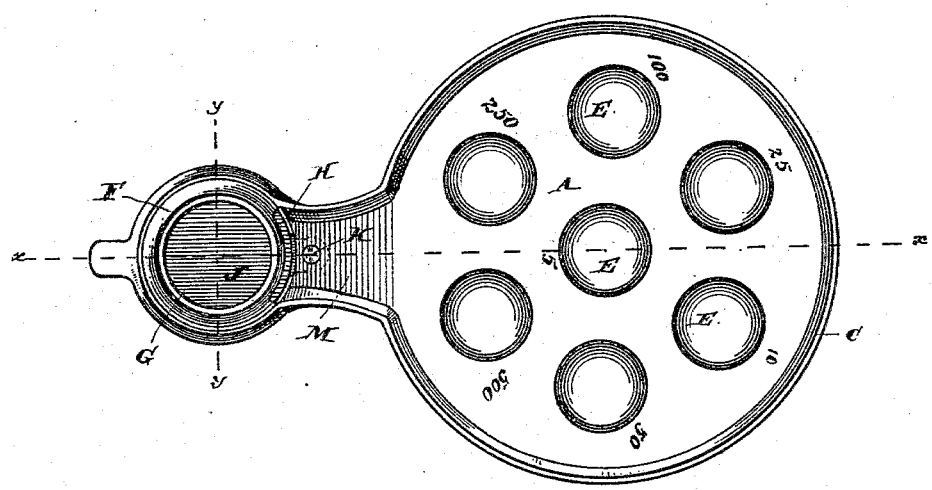
Figure 2:
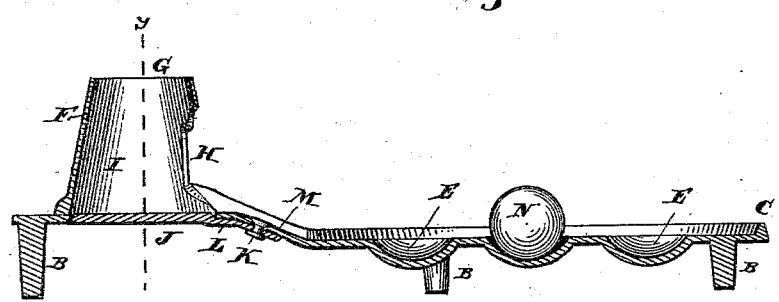
Figure 3:
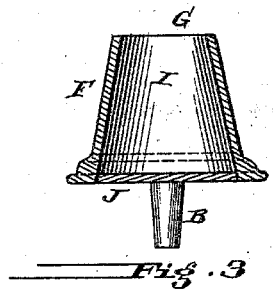

In the drawings, Figure 1 is a plan view of my improved game. Fig. 2 is a sectional elevation of same on line $x$ $x$ of Fig. 1, and Fig. 3 is a cross-section of same on line $y$ $y$ of Fig. 1.

A is the plate, preferably of cast-iron, and which may be made of any shape desired, and is preferably supported upon legs B, is provided with a rim or vertically-extending flange, C, and numerous semi-spherical depressions E, adapted to receive a marble or small ball.

F is a vertical tube, preferably cast solid with the plate A, is open at the top, as at G, and has an aperture, H, on its side facing the plate and close to the bottom. On account of facility in casting and dispensing with a core-box, I make this tube F tapering, being largest at the bottom, and make the hole I through it also tapering and extend clear through. I then place a disk, J, which neatly fits the bottom of said tube F, so as to close the aperture I, and secure said disk in place by means of a rivet, K, which passes through a lug, L, extending from said disk and the plate A. The neck M, connecting the interior of the tube F and the plate, is preferably made slanting, as shown.

The operation is as follows: A marble, N, is dropped down through the tube F, and after striking the disk J rolls out through aperture H down neck M into the plate A and into one of the depressions E, which have different numbers marked thereon.

While I prefer the construction shown, I do not limit myself thereto, as the details may be altered in various ways without departing from my invention.

I am aware of the patent to Larson, No. 236,047, December 28, 1880, and do not claim anything therein set forth or claimed.

Having now described my invention, what I claim as new, and desire to secure by Letters Patent, is—

1. The horizontal plate A, having depressions E, in combination with tube F, located at the periphery of said plate, and having aperture H facing said plate, substantially as and for the purpose specified.

2. The plate A, having depressions E, in combination with tube F, having aperture H facing said plate, and neck M, connecting said tube with said plate, substantially as and for the purpose specified.

3. The plate A, having depressions E, in combination with tube having closed bottom, and aperture H, facing said plate, and inclined neck M, connecting said tube with said plate, substantially as and for the purpose specified.

4. The combination of plate A, having depressions E, tube F, having apertures I H, and plate J, substantially as and for the purpose specified.

5. The combination of plate A, having depressions E, tube F, having apertures I H, neck M, and plate J, substantially as and for the purpose specified.

In testimony of which invention I hereunto set my hand.

ALFRED C. REX.

Witnesses:
W. S. McWADE,
ROBERT J. OWEN.